United States Patent [19]
Dozois

[11] 3,935,686
[45] Feb. 3, 1976

[54] VEHICLE DRAIN HOLE PLUG

[75] Inventor: James H. Dozois, Harper Woods, Mich.

[73] Assignee: General Motors Corporation, Detroit, Mich.

[22] Filed: Apr. 8, 1974

[21] Appl. No.: 458,511

[52] U.S. Cl. ............... 52/302; 220/306; 137/425; 296/154; 49/476
[51] Int. Cl.² .................. E04F 19/08; B60J 9/00
[58] Field of Search ........ 52/302, 506, 507; 220/25, 220/60 R, 306; 244/129 H; 24/73 SM; 296/154; 137/525; 49/476; 85/37, 38

[56] References Cited
UNITED STATES PATENTS

| | | | |
|---|---|---|---|
| 1,105,183 | 7/1914 | Collins | 52/363 |
| 1,800,173 | 4/1931 | Anderson | 220/25 |
| 2,480,692 | 8/1949 | Anthony | 244/129 H |
| 2,728,259 | 12/1955 | Poupitch | 24/73 SM |
| 3,215,303 | 11/1965 | Dearle | 220/60 R |
| 3,472,416 | 10/1969 | Hilton | 220/60 R |

*Primary Examiner*—James L. Ridgill, Jr.
*Attorney, Agent, or Firm*—Arthur N. Krein

[57] ABSTRACT

A drain plug to seal a drain hole opening in a vehicle body panel, the drain plug being generally in the shape of a cross with two crossed arms and, in its pre-installed free position, being folded along a longitudinal fold line extending through one arm to appear tent-shaped in cross section with the extent between the ends of the other arm, which are curved, being such that so as to permit entry of these portions of the other arm through the drain hole in a vehicle body panel. The drain plug is then clinched into assembly with the panel, as by striking the plug in the area of the fold line to collapse the tent-shaped portion of the plug flat against the panel whereby this arm, with the original fold line therein, engages one side of the panel while the ends of the other arm are forced to move beyond the extremities of the drain hole to dig into the opposite side of the panel.

2 Claims, 6 Drawing Figures

VEHICLE DRAIN HOLE PLUG

This invention relates to drain plugs for sealing the drain hole in a vehicle body panel and, in particular, to a quarter filler drain plug for a vehicle.

Various parts of a vehicle body are formed by spaced apart body outer panels and various body inner panels which are seam welded or pinch welded together adjacent to their lower edges. Depending on their location within the vehicle, various openings are provided into the spaces or cavities between these panels as, for example, for the retraction of a window or to provide accessibility to mechanisms used between these panels. Since water can enter through these openings, one or more drain holes are provided in the lower portions of one of the panels to permit the escape of water. These drain holes also serve a function during the construction of the vehicle body to permit the drainage of paint or other rust preventing coating materials used during the assembly of the vehicle. To permit the escape of water from the drain trough formed at the pinch weld area of these panels through these openings while limiting or preventing dust or other ambient material from entering the space between these panels, various sealing plug means have been used to partly close these drain hole openings.

Although a number of these seal drain plugs have been used with satisfactory results, all of the prior known drain plugs have either been expensive to fabricate and/or expensive to install.

It is therefore a primary object of this invention to provide an improved drain plug, for partially enclosing the drain hole opening in a vehicle body, which can be manufactured inexpensively of sheet material and which can readily be installed into the drain opening without the use of special tools.

Another object of this invention is to provide a one-piece drain plug for a drain hole of a vehicle body which can be readily inserted into the drain hole and clinched in place and which will allow drainage from the drain hole in any installed position.

A still further object of this invention is to provide an improved drain plug which is adaptable for partially enclosing a drain hole opening of any desired configuration.

These and other objects of the invention are obtained by means of a drain plug of cross-shaped configuration with two crossed arms, one arm of which is provided with a fold line to permit folding of the plug whereby the extent between the other arm is reduced to permit entry of this arm into a drain hole opening after which the plug can be clinched into position to unfold the first arm whereby this arm engages one side of the panel and, whereby the other arm is forced to move into engagement with the other side of the panel.

For a better understanding of the invention, as well as other objects and further features thereof, reference is had to the following detailed description of the invention to be read in connection with the accompanying drawings, wherein.

Figure 1:
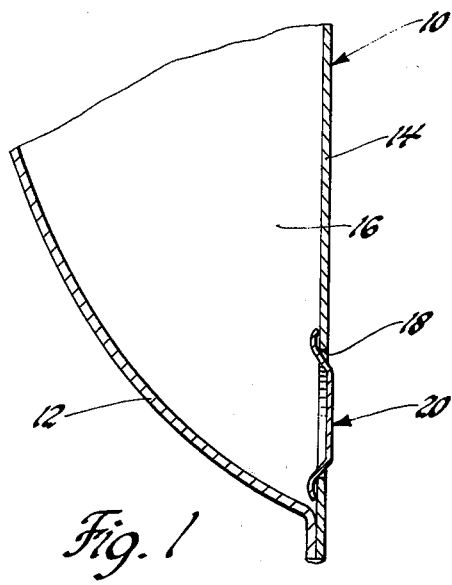
FIG. 1 is a partial sectional view of the quarter panel of a vehicle body provided with a drain plug, in accordance with the invention, to partly seal a drain hole opening in the inner panel of this assembly.

Referring now to the drawings, a vehicle body, generally designated 10, includes an outer body, such as a rear quarter panel 12, and an inner body or filler panel 14, which together define a well or cavity 16, the upper edges of the panels 12 and 14 are spaced apart and therefore water can enter and accumulate within the cavity 16. One or more drain hole openings 18 are provided in the inner panel 14, adjacent to the pinch weld joining the lower ends of the panels together, to permit draining of any water which may accumulate within the cavity 16 between these panels.

A drain plug 20, in accordance with the invention, is mounted within the opening 18 to permit the water to drain through this opening to the exterior of the vehicle body, the drain plug also preventing or limiting ambient material, such as mud, or dust, from entering into the well 16 through the drain opening.

The drain plug 20, in accordance with the invention, is made of relatively thin material suitable for the environment in which it is to be used on a motor vehicle. Drain plug 20 formed, for example, as a sheet metal stamped blank, is in the configuration of a Greek cross with two sets of arms 22 and 24 crossing at their midpoints and substantially normal to each other, with the length of each arm being substantially greater than the diameter of the drain hole 18.

Figure 3:
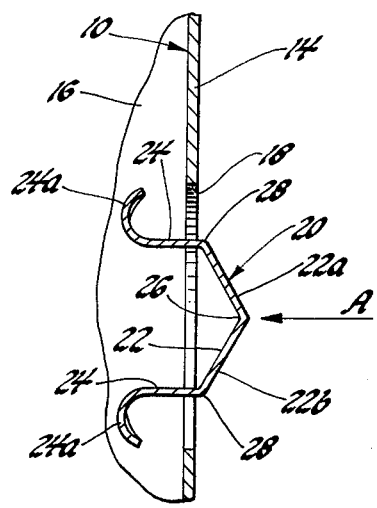
FIG. 3 is a sectional view taken along line 3—3 of FIG. 2.
Figure 2:
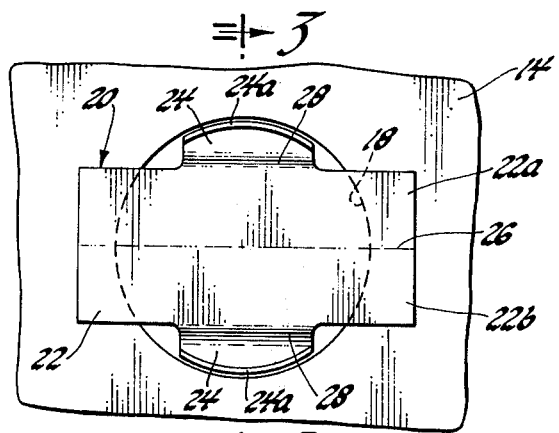
FIG. 2 is a view of the drain plug of FIG. 1 shown in its form during installation into the drain hole opening.
Figure 6:
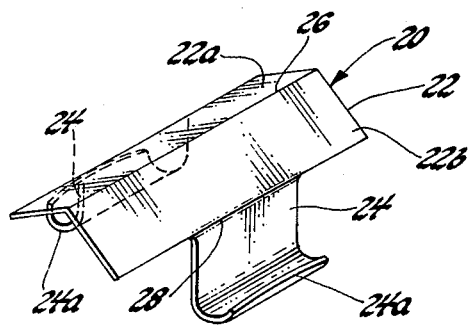
FIG. 6 is a perspective view of the drain plug, in accordance with the invention, showing the plug in its pre-installed free position.

The drain plug, in its pre-installed free position, that is, in its form for insertion into the drain hole 18, the form as seen in FIGS. 2, 3 and 6, has the arm 22 initially bent along a central longitudinal fold line 26 to form, in effect, two arm portions 22a and 22b integrally hinged together about the fold line 26 and partially folded toward each other on one side, the body panel facing side, of the drain plug, the two arm portions, as thus folded, appearing tent-like in cross section. The portions at the opposite ends of arm 24, adjacent to the longitudinal sides of arm 22, are also each bent along fold lines 28 on opposite sides and adjacent to the arm 24 in the same direction as the arm portions 22a and 22b and in a direction toward each other. The free end portions of the opposite ends of arm 24 each terminate in a return bent flange 24a, with the return bent flange 24a portion of each end portion of an arm 24 extending in an opposite direction from the other return bent flange 24a, that is, these return bent flanges are outwardly directed away from the portion of the arm 24 directly adjacent to the arm 22. These opposite end portions of arm 24 may be considered, as will become apparent, as clamp arms extending laterally from the arm portions 22a and 22b of arm 22 whereby a body panel can be clinched between the opposite end portions of arm 24 and the arm 22.

In the above described pre-installed configuration of the drain plug 20, the extent between the free ends of the return bent flanges 24a of the arm 24 is substantially equal to or less than the diameter of the drain hole 18 to permit insertion of the arm 24 of the drain plug into the drain hole 18 with very little additional folding of the drain plug or biasing together of the return bent flange portions 24a of the arm 24. Thus, in its pre-installed configuration, the drain plug 20 is bent into a tent-like cross section so that two ends of its oppositely positioned arm 24 will easily pass through the drain hole and two ends of arm 22 will not pass through the drain hole.

Figure 5:
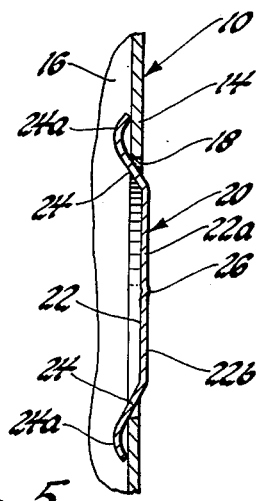
FIG. 5 is a sectional view taken along line 5—5 of FIG. 4.

In the assembly of the drain plug to the vehicle body panel in a position to substantially close the drain hole opening 18, the end portions of the arm 24 are inserted through the drain hole opening 18 so that the drain plug is positioned relative to the vehicle body panel 14, as shown in FIG. 3. To clinch the drain plug into position, it is then necessary to collapse the tent-like configuration of the arm 22 to the position of this arm, as best seen in FIG. 5, as by striking it with a suitable flat tool, such as a hammer, in the area of the fold line 26 in a direction toward the inner panel 14, the direction shown by arrow A in FIG. 3. When the drain plug is thus struck, the two arm portions 22a and 22b will flatten out so that both portions lie substantially flat in a common plane and are in engagement with the outer side of inner panel 14 and, at the same time, the two portions of arm 24 which were passed through the drain hole are now forced to move radially out beyond the extremities of the drain hole and dig into the underside of the panel, and the free end portions of the return bent flanges thereof dig into the inner side of the inner panel 14. By providing the transverse free ends of the return bent flanges 24a with a curved configuration, for example, the semi-circular configuration in the preferred embodiment shown, the midpoints of these transverse ends of the return bent flanges 24a will first engage the inner surface of inner panel 14 to move readily dig into this panel, since their contact will be substantially point contact with this panel. It is apparent that other transverse end shapes may be used to provide point contact in lieu of line contact between these edges and the panel.

Figure 4:
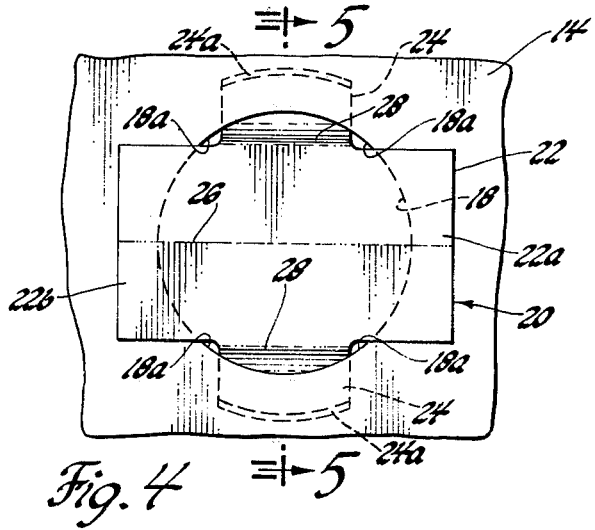
FIG. 4 is a view similar to FIG. 2 but showing the plug in its installed position partially closing the drain hole opening.

In the embodiment of the drain plug 20 shown, as fitted into a circular drain opening 18, this drain plug will substantially cover the drain hole opening 18, only relatively small portions 18a of the hole being left uncovered adjacent to the four intersecting corners of the arms 22 and 24, as seen in FIG. 4. By proper sizing of the drain plug 20 relative to the hole 18, these open portions 18a of the drain hole will be large enough to permit water to drain from the cavity 16 while limiting to within acceptable limits the entry of ambient material into the cavity 16. In addition, the drain plug 20 will allow water drainage through the drain hole 18 in any assembled position of this drain plug into the drain hole of the inner panel.

Although the drain plug 20 has been shown as applied to substantially cover a drain hole 18 of circular configuration, it should be realized that by properly dimensioning the length and width of the arms 22 and 24, this drain plug can be used to substantially seal any suitable shaped drain hole opening in a vehicle body panel, such as a square, rectangular or oval opening.

As previously described, the drain plug 20 of the invention can be made of any suitable material which can be deformed in the manner described above and which is suitable for the environment in which this drain plug is to be used, as in a motor vehicle. Thus, the drain plug can be made of aluminum, copper or steel, it being realized that the material out of which the drain plug is made can be zinc plated, painted or otherwise treated, if necessary, to permit the particular body material of the drain plug to withstand the environment for a particular application of the drain plug.

What is claimed is:

1. A drain plug for partially closing a drain hole opening in a vehicle body panel, said drain plug in the form of a cross of relatively thin material includes a first arm and a second arm at right angle to each other, the drain plug in its pre-installed form being partly folded along a central longitudinal fold line extending across said first arm to divide said first arm into an integral first arm portion and a second arm portion folded toward each other, the opposite ends of said second arm being bent adjacent to said first arm toward each other with their free end portions in a return bend in a direction opposite to each other, the extent between said free ends of said second arm in the pre-installed free form being approximately equal to the diameter of the drain hole opening whereby said second arm can be inserted through the drain hole opening, said first arm portion and said second arm portion of said first arm being movable about said fold line toward an unfolded position whereby the extent between said free ends of said second arm is increased to a length substantially greater than the diameter of the drain hole opening whereby said first arm engages one side of the body panel and the free ends of said second arm engage the opposite side of the body panel, the end surface of each of said free end portions being of a shape to provide substantially point contact between these end surfaces and the body panel.

2. A drain plug for partially closing a drain hole opening in a vehicle body panel, said drain plug of relatively thin deformable material includes a pair of integral arm portions of a length greater than the diameter of the drain hole folded toward each other about a common longitudinal fold line, each of said arm portions having an integral clamp arm portion extending from one side thereof in a direction normal to said fold line, said clamp arm portions being folded adjacent to said arm portions in a direction toward each other and are provided at their free ends with return bent portions extending in opposite directions away from each other, the extent between said return bent portions being such as to permit entry of said clamp arm portions through the drain hole opening, said arm portions being movable about said fold line toward a position in which they lie substantially in a common plane to increase the extent between said return bent portions whereby said arm portions will engage one side of the panel and said return bent portions will engage the opposite side of the panel.

* * * * *